UNITED STATES PATENT OFFICE.

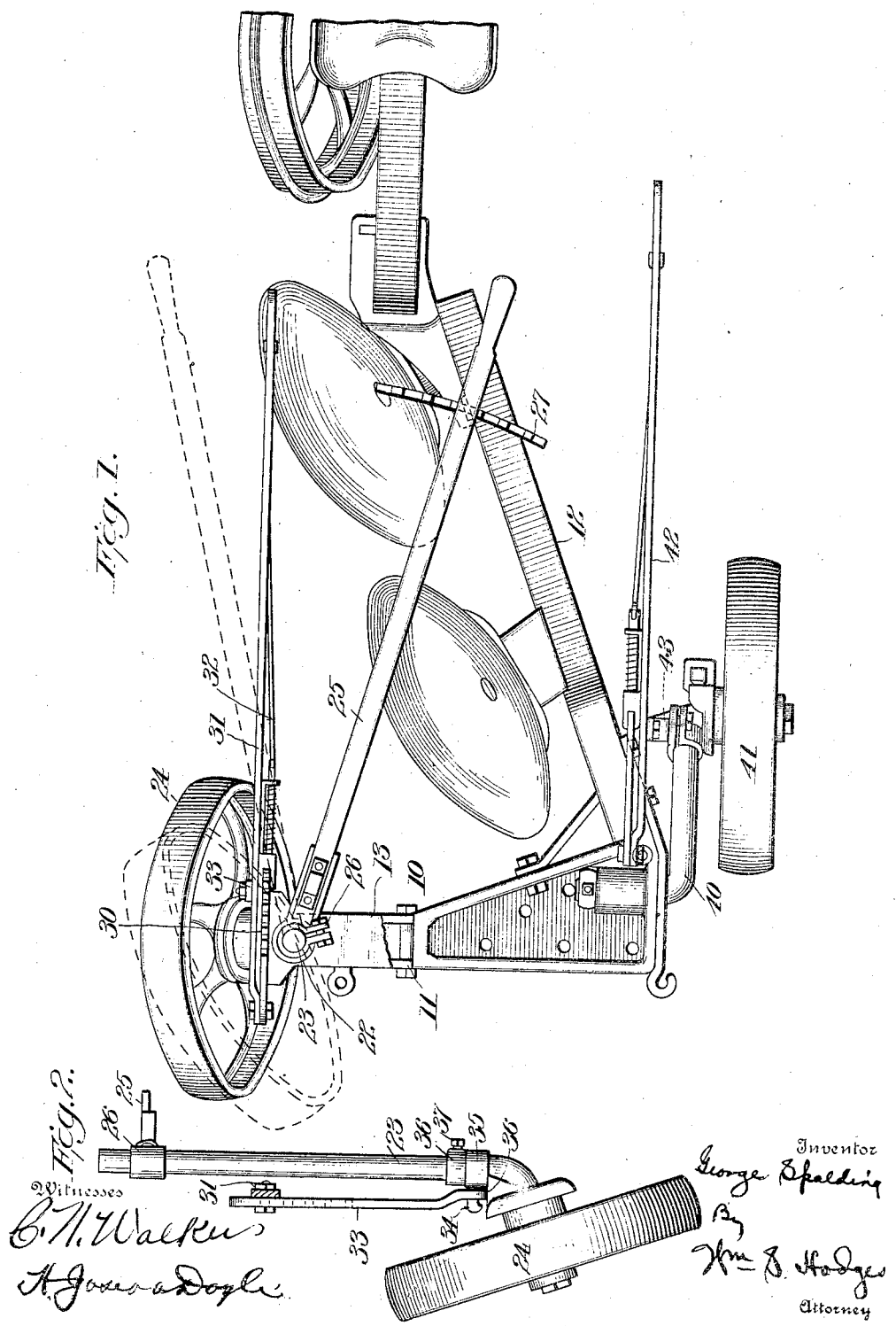

GEORGE SPALDING, OF STOCKTON, CALIFORNIA.

STEERING-GEAR FOR TILLING-MACHINES.

955,107.  Specification of Letters Patent.  Patented Apr. 12, 1910.

Application filed December 30, 1908. Serial No. 470,038.

*To all whom it may concern:*

Be it known that I, GEORGE SPALDING, of Stockton, in the county of San Joaquin, State of California, have invented certain new and useful Improvements in Steering-Gear for Tilling-Machines, of which the following is a specification.

This invention relates to certain new and useful improvements in tilling machines.

The invention has for its object the production of improved means for readily and easily controlling the direction of movement of the machine to conform to the contour of the ground and control the width of the furrow to be made, and the character of the work to be performed.

A further object is to provide improved steering means which will not be affected, or interfered with in operation, by the adjustments of height, width, or otherwise, of the machine, or its carrying frame.

The invention will be hereinafter fully set forth and particularly pointed out in the claims.

In the accompanying drawing:—Figure 1 is a top plan view of a tilling machine embodying my invention. Fig. 2 is a detail front view of the steering wheel, parts being shown in section.

Referring to the drawing, 10 designates the frame formed with two members 11, 12, the former being arranged transversely to the line of draft, and the latter extending rearwardly from one end of arm 11 to form the backbone. Said backbone is inclined downwardly and deflected laterally or transversely to the line of draft, but I do not desire to limit myself as to any particular form of frame. The section 13 is provided with a vertical boss 22 arranged to receive a shaft 23 the lower end of which is bent to form an axle for the forward furrow wheel 24 which is also the steering wheel.

A steering lever 25 is provided having at one end a split sleeve 26 embracing the protruding end of the steering shaft 22, the free end of said lever being arranged to engage a rack 27. Said split sleeve is tightened by means of a bolt 28, whereby the position of said sleeve upon shaft 22 may be adjusted at will.

The adjustable section 13 is provided with a segmental rack 30 to which is pivoted one end of a hand lever 31 provided with the usual locking pawl and lever 32. Pivotally connected at one end to lever 31 is a link or bar 33, the lower end of which engages a lug 34 carried by a collar 35 loosely mounted on shaft 23, a second collar 36 provided with a set screw 37 to engage said shaft, being arranged above collar 35 to prevent displacement of the latter. Said link 33 is provided with a series of holes whereby the connection with the lever 31 may be adjusted. The lower end of link 33 is supported by a flattened portion or table 36 formed on the bearing sleeve 37 of wheel 24. The collar 35 also rests upon said table. By this arrangement the link 33 sustains the weight of the contiguous side of the frame, and said side is raised or lowered, by manipulating lever 31, without interfering with the steering functions of wheel 24. The opposite side of the frame is provided with an arm 40 carrying the land wheel 41 and connected with the lever 42 by means of a link 43. By this arrangement the contiguous side of the frame may be raised or lowered.

In practice, the frame is raised or lowered to conform to the work, by means of levers 31 and 42, and after the desired adjustment has been secured the split sleeve 26 is placed in the proper position upon the steering shaft, to conform to said adjustment. In operation, the machine is guided by lever 25 which turns the shaft 22 and wheel 24, said lever acting as a tiller handle. The end of link or bar 33 rides upon the table 36, which latter is large enough to permit the wheel 24 to turn and yet sustain the end of said link, thus supporting the weight of the frame at all times.

It is obvious from the foregoing that while I have illustrated and described my improved steering mechanism in connection with an implement of the tilling machine type, it is not limited to this class of inventions, as it is quite apparent that it is equally applicable to various other forms of machines.

I claim as my invention:—

1. A steering gear for tilling machines comprising a frame, a steering shaft rotatably mounted in said frame, a wheel bearing carried by said shaft, and provided with an extension, and frame adjusting means resting on the extension of said bearing to support the contiguous portion of said frame, said bearing being movable with relation to said supporting means.

2. A steering gear for tilling machines comprising a frame, a steering shaft rotatably mounted in said frame, a wheel bearing carried by said shaft, and a supporting link or bar for said frame having one end resting on said bearing, said bearing being free to move beneath said link.

3. A steering gear for tilling machines comprising a frame, a steering shaft rotatably mounted thereon, a wheel bearing carried thereby provided with a flattened table portion, a supporting link or bar for said frame having one end resting on said table portion, said bearing being free to move beneath said link.

4. A steering gear for tilling machines comprising a frame, a steering shaft rotatably mounted in said frame, a wheel bearing carried by said shaft, a supporting link for said frame having one end resting on said bearing, means for connecting said link or bar and said shaft, and means connected with said link or bar for raising and lowering the frame.

5. A steering gear for tilling machines comprising a frame, a steering shaft rotatably mounted in said frame, a wheel bearing carried by said shaft, a supporting link or bar for said frame having one end supported on said bearing, a collar encircling said shaft and resting on said bearing, connections between said link or bar and said collar, and means connected with said link or bar for raising and lowering the same.

6. A steering gear for tilling machines comprising a frame, a steering shaft rotatably mounted in said frame, a wheel bearing carried by said shaft and provided with a flattened portion, a supporting link for said frame having one end resting on said flattened portion, and means for holding said link in definite relation with said flattened portion.

7. A steering gear for tilling machines comprising a frame, a steering shaft rotatably mounted in said frame, a wheel bearing carried by said shaft, a supporting link for said frame having one end resting upon said bearing, and a collar encircling said shaft and connected with said link.

8. A steering gear for tilling machines comprising a frame formed with a member arranged transversely to the line of draft and provided at one end with a boss, a steering shaft mounted in said boss, a bearing sleeve carried by said shaft and provided with an extension, and frame adjusting means resting on the extension of said sleeve to support the contiguous portion of said frame, said sleeve being movable with relation to said supporting means.

9. A steering gear for tilling machines comprising a frame formed with a member arranged transversely to the line of draft and provided at one end with a boss, a steering shaft mounted in said boss, a bearing sleeve carried by said shaft, and a supporting link or bar for the frame having one end resting on said sleeve, said bearing being free to move beneath said link.

10. A steering gear for tilling machines comprising a frame formed with a member arranged transversely to the line of draft and provided at one end with a boss, a steering shaft mounted in said boss, a bearing sleeve carried by said shaft and provided with a flattened portion, and a supporting link for said frame having one end resting on said flattened portion.

In testimony whereof, I have signed this specification in the presence of two subscribing witnesses.

GEORGE SPALDING.

Witnesses:
CHAS. E. RIORDAN,
WM. S. HODGES.